United States Patent [19]

Guile

[11] Patent Number: 4,702,636

[45] Date of Patent: Oct. 27, 1987

[54] SYSTEM FOR CONNECTING TWO MEMBERS TOGETHER

[75] Inventor: Peter J. D. Guile, Reading, United Kingdom

[73] Assignee: Exxon Production Research Company, Houston, Tex.

[21] Appl. No.: 829,458

[22] Filed: Feb. 12, 1986

Related U.S. Application Data

[63] Continuation-in-part of Ser. No. 686,172, Dec. 24, 1984, abandoned.

[30] Foreign Application Priority Data

Jan. 6, 1984 [GB] United Kingdom ............... 8400332

[51] Int. Cl.$^4$ ............................................. E02B 17/00
[52] U.S. Cl. ..................................... 403/24; 403/314; 403/359; 405/224; 114/264
[58] Field of Search ............... 403/314, 359, 367, 368, 403/369, 24; 405/224, 225; 114/264, 265; 411/51, 49, 44

[56] References Cited

U.S. PATENT DOCUMENTS

| 2,089,168 | 8/1937 | Brown | 403/359 X |
|---|---|---|---|
| 2,108,679 | 2/1938 | Kurti | 308/135 |
| 2,959,016 | 11/1960 | Parks | 405/228 |
| 3,197,216 | 7/1965 | Jackson | 277/137 |
| 3,200,693 | 8/1965 | Dickow | 411/51 |
| 3,249,377 | 5/1966 | Weasler | 267/103 |
| 3,287,031 | 11/1966 | Simmons et al. | 285/27 |
| 3,574,366 | 4/1971 | Thostenson | 287/53 |
| 3,726,546 | 4/1973 | Brown | 285/91 |
| 3,841,695 | 10/1974 | Woodward | 403/369 X |
| 3,911,688 | 10/1975 | Behar et al. | 144/264 X |
| 3,971,186 | 7/1976 | Havelka et al. | 403/374 X |
| 4,062,571 | 12/1977 | Marseilles | 285/26 |
| 4,167,279 | 9/1979 | Lucksinger | 285/144 |
| 4,372,706 | 2/1983 | Young | 405/195 |
| 4,453,859 | 6/1984 | Sedillot et al. | 405/195 X |
| 4,505,614 | 3/1985 | Anschutz | 405/195 |

FOREIGN PATENT DOCUMENTS 1750162 5/1979 Fed. Rep. of Germany ........ 411/51

OTHER PUBLICATIONS

Offshore Engineer, "Hutton-Tension Goes on at World's First TLP", Aug. 1984, pp. 26, 27, 30, 31.

Primary Examiner—Cornelius J. Husar
Assistant Examiner—Joseph A. Fischetti
Attorney, Agent, or Firm—Richard F. Phillips

[57] ABSTRACT

A coupling 10 for connecting an elongate first member 12 to a second member 14. The first member 12 is provided with external radial fins 16. The second member 14 defines a recess provided with a number of internal radial fins 20. The first and second members 12,14 and their fins 16,20 are sized such that the first member 12 can be positioned within the recess of the second member 14 with each fin of each member extending between two corresponding fins of the other member. At least one wedge 24 is positioned in the space intermediate each set of opposing fins 16,20. The fins 16,20 and wedge 24 are configured such that biasing the first member 12 in a first axial direction relative to the second member 14 causes the wedge 24 to lock the fins 16,20 together, preventing movement of the first member 12 in the first axial direction. The present coupling 10 can be used to support the members 12,14 under either a tensile or compressive axial loading. The coupling 10 is especially well suited for adjustably connecting a tension leg offshore platform to the tethers securing it to the seafloor.

12 Claims, 19 Drawing Figures

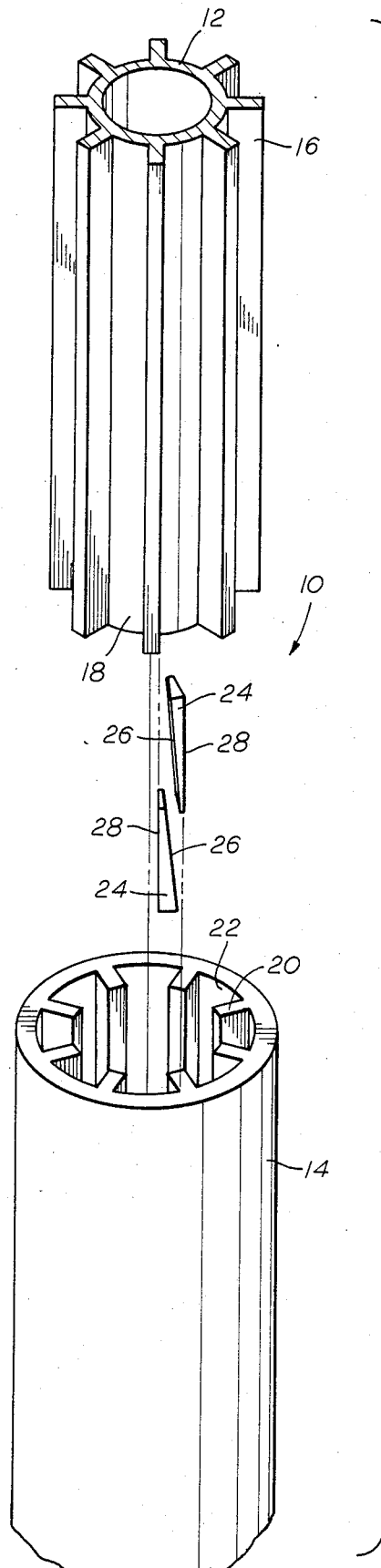
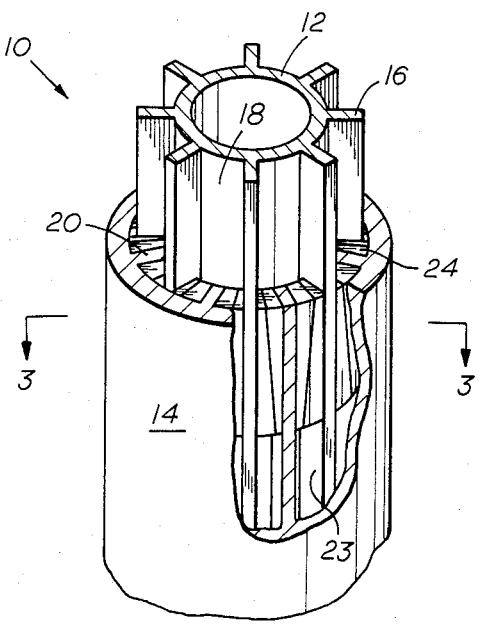
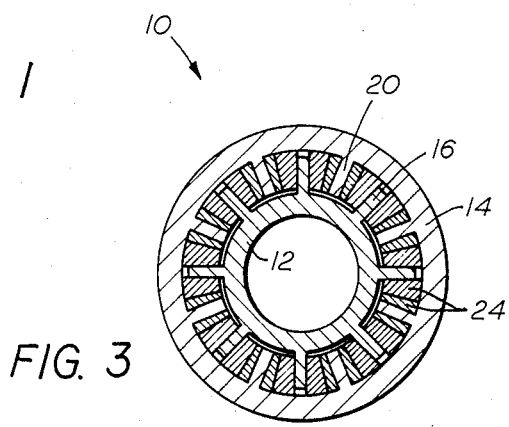
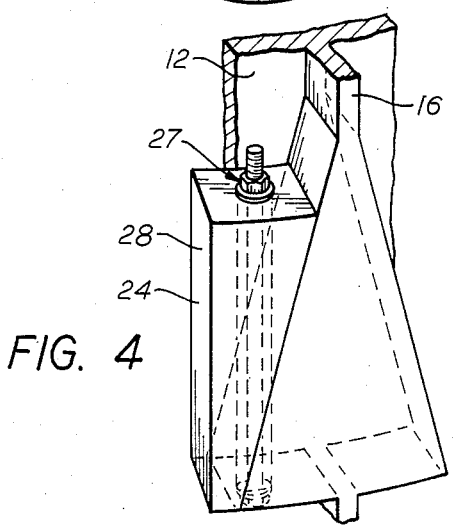
FIG. 1
FIG. 2
FIG. 3
FIG. 4

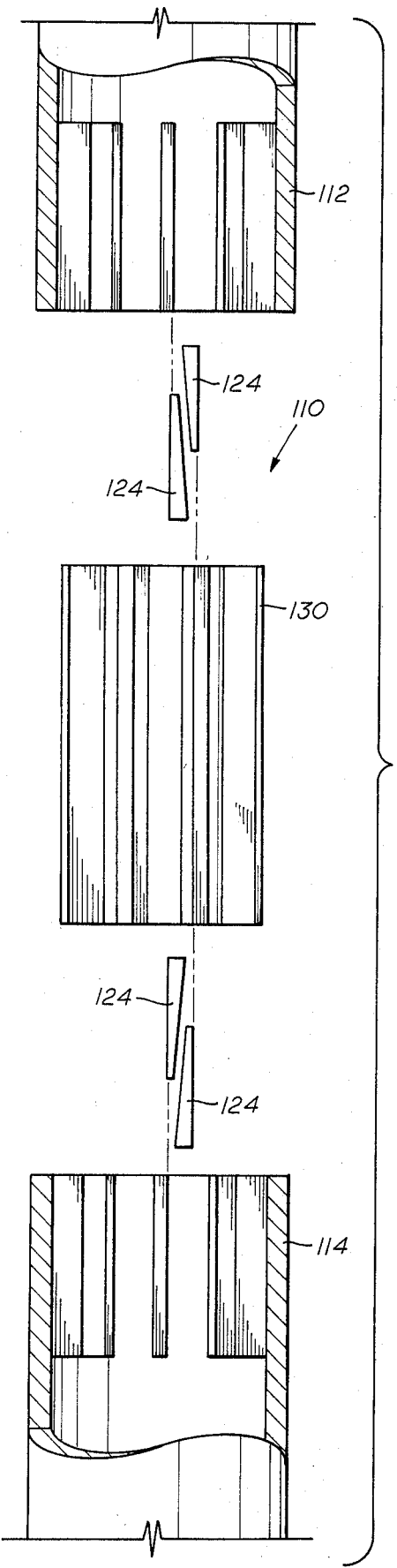
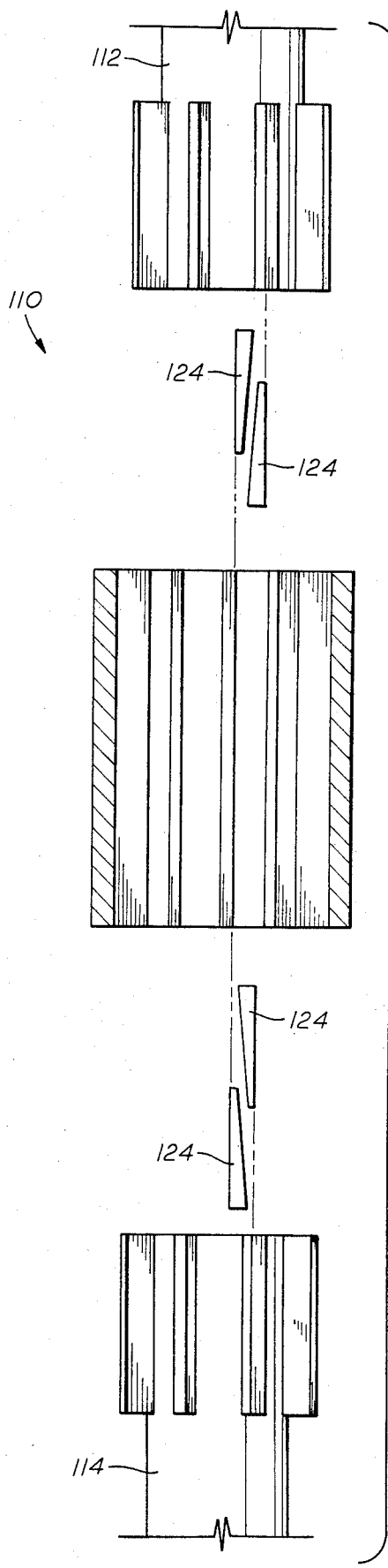
FIG. 5
FIG. 6

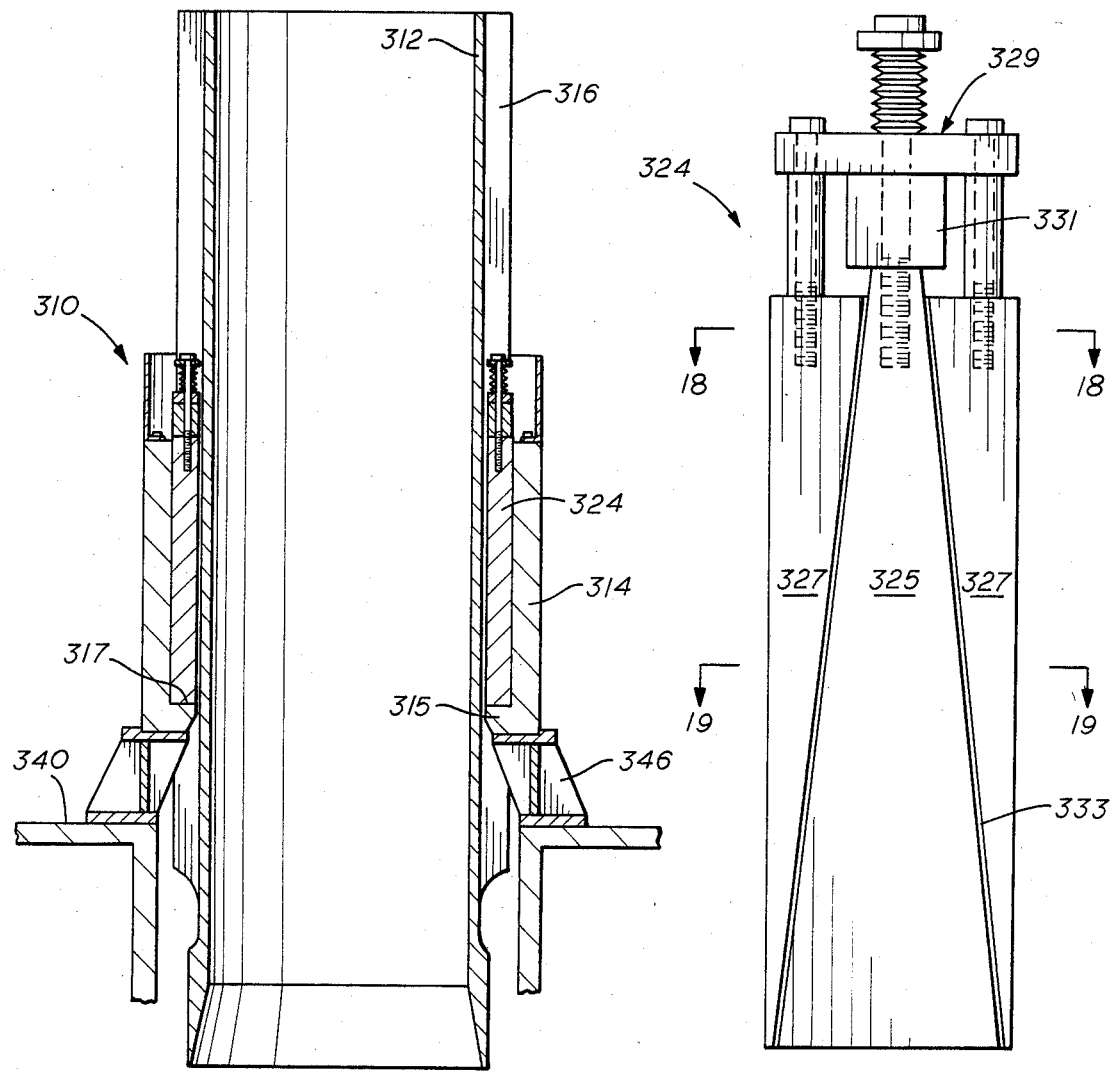
FIG. 16
FIG. 17
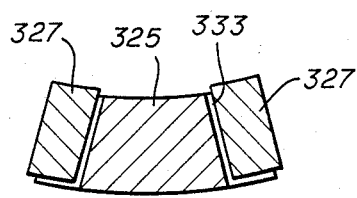
FIG. 19
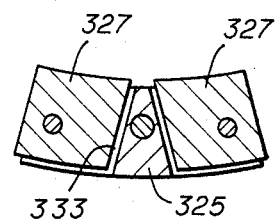
FIG. 18

SYSTEM FOR CONNECTING TWO MEMBERS TOGETHER

CROSS REFERENCE TO RELATED APPLICATION

This application is a continuation-in-part of patent application Ser. No. 686,172, filed Dec. 24, 1984, now abandoned.

FIELD OF THE INVENTION

This invention relates generally to a connector for securing an elongate member to another member. More particularly, this invention relates to a coupling for adjustably securing a tension leg offshore platform to a set of tubular tethers extending to the ocean surface from a foundation on the ocean floor.

BACKGROUND OF THE INVENTION

Connecting an elongate member to another element may be accomplished in a variety of manners well familar to those skilled in the art. In those applications where the elongate member need never be detached from the other element, the connection between the two can take the form of a permanent bond such as a welded, riveted or interference-fit connection. However, when it is necessary that the elongate member be readily adjusted or detached relative to the other element, the choice of connection methods is restricted. For such applications, one of three classes of connectors is commonly employed. These are: interlocking connectors, such as threaded and bayonet couplings; clamp-type connectors, such as bolted flange coupling; and, wedge-type connectors, in which a tensile or compressive loading imposed on the elements being connected establishes some form of wedging action locking the two elements together.

One of the most demanding applications of adjustable connectors is the tether to platform connection in a tension leg offshore platform. A tension leg platform includes a buoyant platform attached by a set of elongate tubular tethers to a foundation on the seafloor. The location at which the platform is attached to each tether is selected such that the platform is maintained at a draft several meters greater than would be the case were the platform not restrained by the tethers. The resulting buoyant force of the platform imposes a high tensile loading on the tethers. This greatly restrains platform motion induced by waves, currents and winds. The tether to platform connectors must allow ready adjustability of the tether length such that the tension may be maintained at an optimum level in response to changing environmental conditions and varying platform buoyancy. These connectors must also be capable of withstanding the extremely high axial loads imposed by platform buoyancy. Further, because the axial load on the tethers includes a cyclical component resulting from wave action, it is important that the connectors be highly resistant to fatigue.

One tension leg platform design, described in an article entitled "Hutton-Tension goes on at World's First TLP", *Offshore Engineer*, August 1984, pp. 26-31, utilizes a threaded coupling to secure each tether to the buoyant platform. The upper several meters of each tether are threaded to receive a corresponding threaded collar. The threaded collar rests atop a mooring flat in the tension leg platform such that with the tether in tension the collar applies a downward force to the platform. Tether tension is adjusted by rotation of the collar in the appropriate direction. This design is disadvantageous in that the high loadings at the threaded interface between the collar and tether can cause the collar to seize in operation. Further, in applications in which a buoyant tubular tether is required, the large tether diameter introduces significant machining and assembly difficulties.

Many of the disadvantages of threaded connectors may be avoided through use of a wedge-type connector. However, existing wedge-type connectors have been thought unsuitable for use as tether couplings in tension leg platforms. Wedge-type connectors are used for releasably connecting a tubular element to a structure where the tubular element is under a high axial load. A typical example, adapted for connecting a tubular casing string to a riser pipe, is shown in U.S. Pat. No. 4,167,279, issued Sept. 11, 1979. Such connectors employ a series of arcuate slips arranged in an annular array intermediate a cylindrical support element and the elongate tubular element. Connectors of this type are not well suited for supporting tubular elements in situations in which the axial load is of the magnitude occurring in tension leg platform tethers. Casing slips operate by imposing a high, radially inward load on the supported tubular element. This radially inward load is directly proportional to the axial load on the tubular member. If the axial load is sufficiently great, the radially inward force imposed by the slips can become great enough to collapse the tubular member at the position at which it is supported.

It would be advantageous to provide a connector for securing an elongate member to another element wherein the point of connection on the elongate element is readily adjustable. It would be further advantageous to provide a connector for use in applications requiring high axial loading wherein the connector does not impose high radial loadings on the elongate element.

SUMMARY OF THE INVENTION

Disclosed herein is a connector for joining two members together. In a preferred embodiment the connector is used for adjustably attaching an elongate member to a structure under high axial loading. The structure defines a recess, which may, for example, be the interior portion of a tubular element of the structure. This recess is provided with a series of internal radial fins. These fins define channels in the recess, each channel being bounded by adjacent structure recess fins. The elongate member is provided with a corresponding set of external radial fins. The finned elongate member is configured such that it may be inserted within the recess with each fin of the elongate member extending within a corresponding one of the channels. Thus, each channel is divided by a corresponding elongate member fin into two elongate spaces, each such space being faced on one side by a structure recess fin and on the other side by an elongate member fin. At least one wedge is situated in each space for use in locking the elongate member within the recess.

The present invention is especially advantageous in that it can be readily fabricated, does not require close tolerances, can be easily adjusted, and imposes much smaller radial loading on the elongate element than do other wedge-type connectors. These advantages render the connector of the present invention especially well suited for use in securing a tension leg platform to a set of tubular tethers extending from the seafloor to the platform.

BRIEF DESCRIPTION OF THE DRAWINGS

For a better understanding of the present invention, reference may be had to the accompanying drawings, in which:

FIG. 1 shows an exploded perspective view of a basic embodiment of the present invention for connecting two members together;

FIG. 2 shows a view corresponding to FIG. 1 with the two members in coupled condition;

FIG. 3 shows a cross-sectional view taken along line 3—3 of FIG. 2;

FIG. 4 shows a detailed view of a fin and wedge assembly incorporating a modification to the embodiment shown in FIGS. 1-3;

FIG. 5 shows an embodiment of the present invention adapted for joining two like elongate tubular members;

FIG. 6 shows an embodiment of the present invention adapted for joining two like elongate non-tubular members;

FIG. 16 is a cross sectional view taken along section line 16—16 of FIG. 13;

FIG. 17 is an elevational view of the wedge unit used in the tether tensioning coupling of FIG. 13.

FIG. 18 is a cross sectional view taken along section line 18—18 of FIG. 17;

FIG. 19 is a cross sectional view taken along section line 19—19 of FIG. 17.

Figure 7:
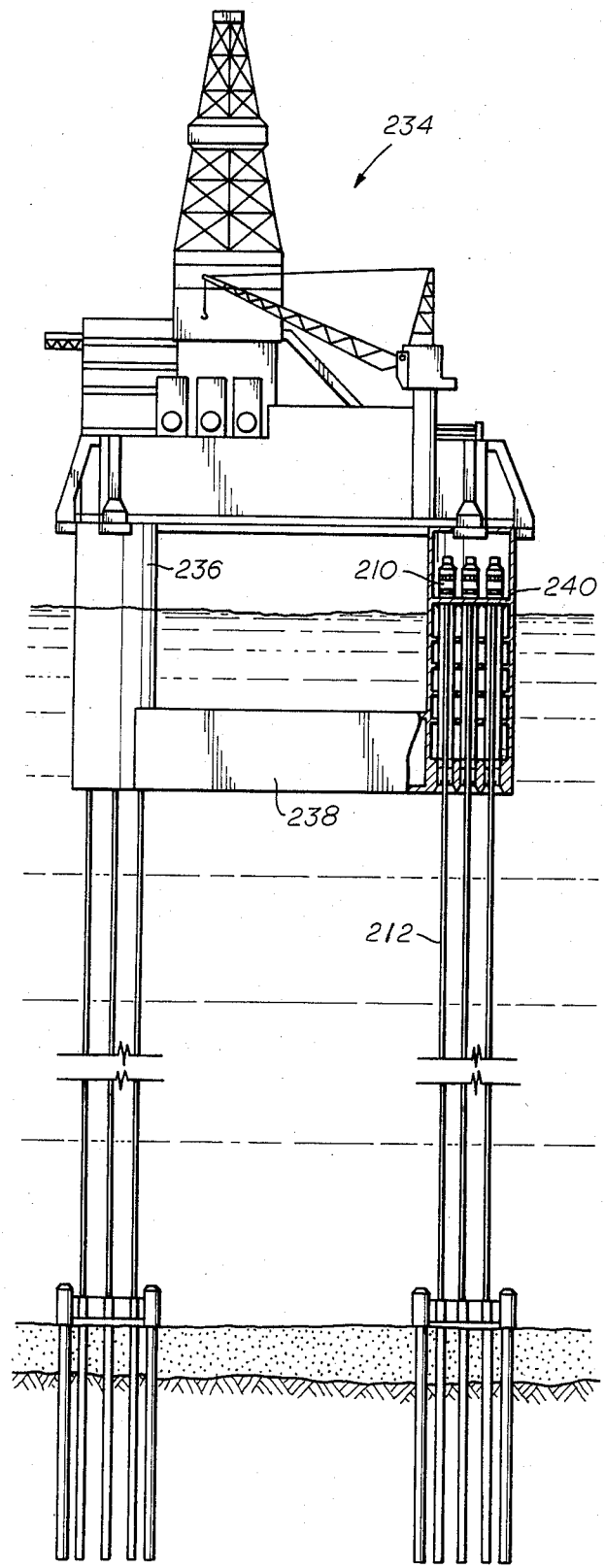
FIG. 7 shows a tension leg platform incorporating an embodiment of the present invention for use in tensioning the platform tethers.

These drawings are not intended as a definition of the invention, but are provided solely for the purpose of illustrating certain preferred embodiments of the invention as described below.

BEST MODE OF PRACTICING THE INVENTION

Described below and illustrated in the Figures are various embodiments of the coupling 10 of the present invention. Basic embodiments of the coupling 10, illustrating certain principles and features of the present invention, are shown in FIGS. 1-6. A preferred embodiment of the coupling 10, shown in FIGS. 7-11, is intended for use in securing the tethers of a tension leg offshore platform to the main body of the platform. However, as will become apparent in view of the following description, the coupling 10 can take many other forms and has numerous other applications. To the extent that the following description is specific to certain embodiments and applications, this is by way of illustration rather than limitation.

In a basic embodiment of the present invention, shown in FIGS. 1-3, the coupling 10 is adapted for securing an elongate first member 12 to a second member 14 such that the first member 12 is fixed against movement in a predetermined axial direction. Though the first and second members 12,14 are illustrated as being discrete components, one or both of the first and second members 12,14 may be a portion of a larger assembly or structure. As shown in FIGS. 1-3, the first and second members 12,14 are tubular elements with the outer diameter of the first member 12 being smaller than the inside diameter of the second member 14. The first member 12 is provided with a plurality of fins 16 extending radially outward from its outer surface 18. The second member 14 is provided with a corresponding plurality of fins 20 extending radially inward from its inner surface 22. As best shown in FIGS. 1 and 2, each set of fins 16,20 defines an annular array centered about a central axis of the coupling 10. The two sets of fins 16,20 are sized such that the finned portion of the first member 12 may be inserted within the finned portion of the second member 14, as best shown in FIGS. 2 and 3. The fins 16,20 of the first and second members 12,14 each extend a substantial radial distance into the channel separating two corresponding adjacent fins of the other member. Thus, the annular region intermediate the first and second members 12,14 is radially divided by the fins 16,20 into a series of axially extending recesses 23. The lateral sides of the radial fins 16,20 serve as load support surfaces along which loads are transferred between the first and second members 12,14 of the coupling 10.

Loading elements, which in the preferred embodiment are a pair of opposed wedges 24, are positioned within each of the axially extending recesses 23. As best shown in FIG. 1, the wedges 24 each have an inclined surface 26 along which the wedges 24 are in contact with one another. As the wedges 24 are driven together, the distance between the two outer, fin-contacting surfaces 28 of the wedges 24 increases due to the inclination of the surface 26 along which they are in contact. As best shown in FIG. 3, the wedges 24 are slightly tapered in the radial direction to accommodate the radial orientation of the fins 16,20. Alternately, the fins 16,20 can be tapered such that the facing surfaces of the two fins 16,20 facing each recess 23 are parallel. This eliminates the need for tapering the wedges 24 in the radial direction. In certain embodiments it may be desirable to face the inclined surfaces 26 or fin-contacting surfaces 28 of the wedges 24 with an elastomer. This is because elastomeric faced surfaces provide bearing characteristics for the wedge-to-wedge and wedge-to-fin interfaces which are substantially more predictable than bare metallic surfaces, the properties of which are subject to corrosion, accidental lubrication and galling.

With the wedge pairs 24 oriented as shown in FIGS. 1 and 2, the first and second members 12,14 lock together in response to the application of a tensile loading. Assuming the wedges 24 are in an initially unloaded condition, a tensile loading on the first and second elements 12,14 causes the first element 12 to move upward relative to the second element 14. This movement drives the wedges 24 together, biasing the two fins 16,20 bounding each wedge pair 24 away from one another. Simultaneously, however, all the other wedge pairs 24 undergo a similar action, placing all the wedges 24 and fins 16,20 in hoop compression. This hoop compression establishes surface friction across all the wedge-fin interfaces. As the axial loading increases, the wedge-fin loading increases. This locks the first and second members 12,14 against being moved axially apart once the wedges 24 have engaged the fins 16, 20. Because the clamping forces which result from the wedging action are circumferential, a series effect is established. That is, ignoring the radial components of the force, the required clamping force passes through all of the wedges and fins as a single compressive hoop force, within the annulus defined by the outer surface 18 of the first member 12 and the inner surface 22 of the second member 14.

Movement of the first and second members 12,14 together is unrestrained, since movement in this direction unloads the wedges 24, freeing the first and second members 12, 14 from restraint. Reversing the orientation of the wedges 24 reverses the axial loading which the coupling 10 can support. For example, the coupling 10 of FIGS. 1–3 supports a tensile loading imposed on the first and second members 12,14; by reversing the wedges 24, the coupling 10 will lock the first and second members 12,14 together in response to compressive loadings while permitting the first and second members 12,14 to move freely in response to tensile loadings.

The wedges 24 may be discrete, removable components, as shown in FIGS. 1–3, or may be integral with or otherwise secured to the fins 16,20 to which they correspond, as shown in FIG. 4. The compressive hoop force which serves to clamp the first and second members 12,14 to one another is developed in the embodiment of FIGS. 1–3 by the application of axial forces to the first and second members 12,14. Alternatively, separate means 27 for driving the wedges 24 together independent of fin movement may be employed, as shown in FIG. 4. The advantage of the latter embodiment is that a coupling 10 incorporating such wedge driving means 27 may be used to lock the first and second members 12,14 together independent of the existence or orientation of the axial loading applied to the first and second members 12,14.

It will be appreciated that alternative embodiments of the present invention can be provided with elements other than wedges for loading the fins 16,20 to lock the first and second elements 12,14 together. In certain applications hydraulic cylinders could be used for this purpose.

Shown in FIGS. 5 and 6 are alternate embodiments of the present invention in which a first and a second member 112,114 can be secured together without the need for one of the members to extend within the other. This embodiment is especially useful in connecting non-tubular members or similarly sized tubular members. The first and second members 112,114 are secured to opposite ends of a coupling member 130 by use of the wedge coupling of the present invention. The wedges 24 are oriented to accept either a compressive or tensile loading, as may be required for the application. Alternately, wedge driving means 27 can be employed to lock the members 112,114 together independent of the existence of an external loading. It will be apparent to those skilled in the art that with a suitably configured coupling member 130, two members 112,114 of substantially any cross-section can be joined.

The coupling of the present invention is especially well adapted for use in supporting and adjusting the tether load in a tension leg offshore platform 234. A tension leg platform 234 incorporating tether couplings 210 adapted for this purpose is shown in FIGS. 7–11. The platform 234 is provided with four columns 236 and four pontoons 238 which define a plurality of buoyancy chambers for the buoyant support of the platform 234. Tensioned tethers 212 extending from a foundation on the seafloor to the columns 236 are used to maintain the platform 234 on location. Each column 236 is provided with a horizontal mooring flat 240 which acts as a support surface through which th load imposed by the tensioned tethers 212 is transferred into the hull structure of the tension leg platform 234. The upper portion of each tether 212 extends upward in the column 236 through an aperture 242 in the mooring flat 240.

Figure 10:
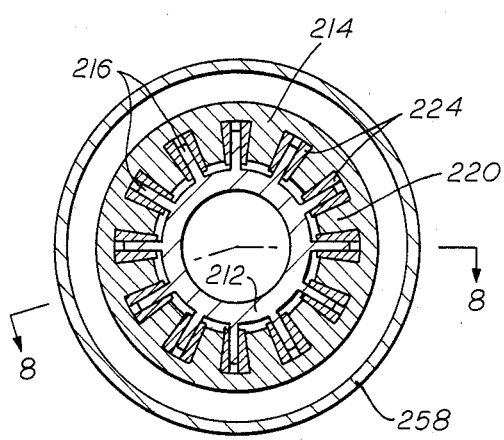
FIG. 10 is a cross-sectional view taken through section line 10—10 of FIG. 8.
Figure 11:
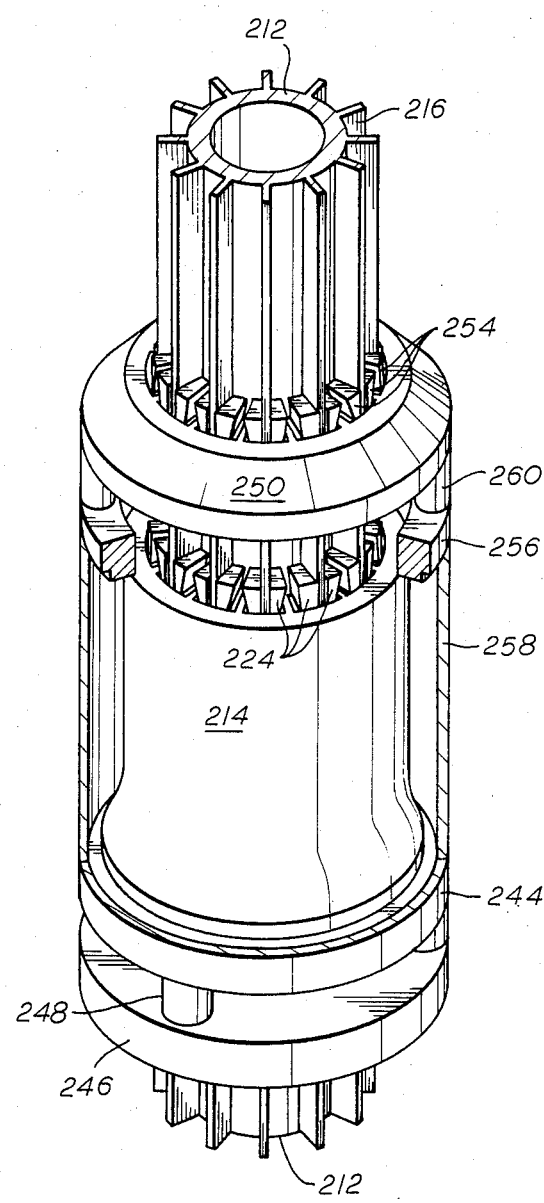
FIG. 11 is an isometric, partially cut-away view of the coupling of FIG. 8—in the interest of clarity, the wedges in this view are illustrated as having been pulled upward a short distance from their locking position.

That portion of the tether 212 passing through the mooring flat 240 is provided with a plurality of external, radial fins 216. This finned portion of the tether 212 extends through a main wedge yoke 214 having a plurality of interior radial fins 220, each of which extends into the channel separating the corresponding tether fins 216, as shown in FIG. 10. Each of the main wedge yoke fins 220 has a thickness which is tapered such tha the side-to-side distance is greater at the bottom than at the top of the fin 220. A similar such fin is illustrated in FIG. 4. As best shown in FIG. 11, a single discrete wedge 224 is situated in each of the two axially extending recesses separating each tether fin 216 from the two adjacent main wedge yoke fins 220. With the wedges 224 in place, the tether 212 is prevented from moving downward relative to the main wedge yoke 214. Thus, once the tether 212 is properly tensioned, as described below, the main wedge yoke 214 is maintained in tension by the tether coupling 210.

The main wedge yoke 214 is supported on the mooring flat 240 through upper and lower ring beams 244,246. Interposed between the two ring beams 244,246 is a set of three load cells 248 for use in monitoring the load supported by the coupling 210.

Figure 8:
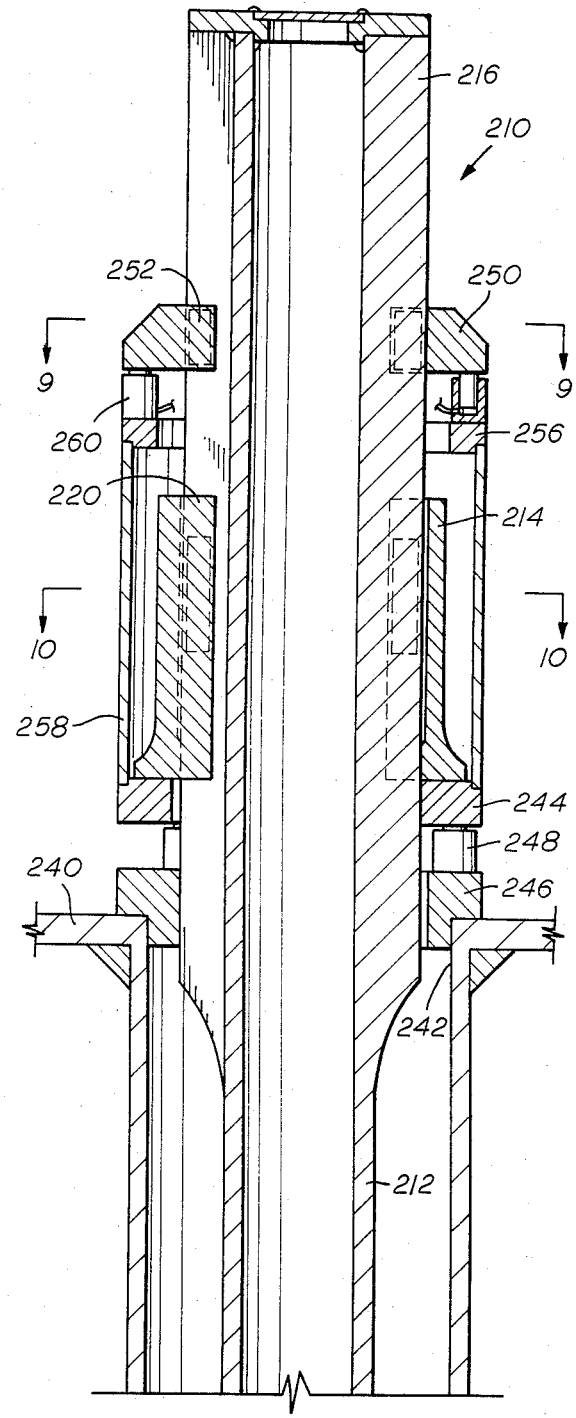
FIG. 8 shows a detailed view in axial cross-section of one of the tether tensioning couplings of the tension leg platform of FIG. 7.
Figure 9:
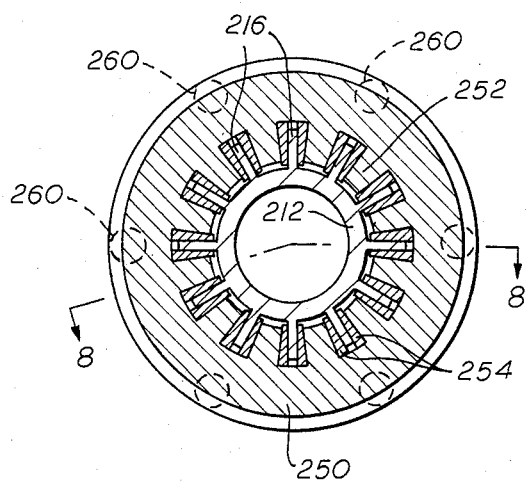
FIG. 9 is a cross-sectional view taken through section line 9—9 of FIG. 8.

In the preferred embodiment of the tether coupling 210, an upper yoke 250 is provided to facilitate adjustment of the tether tension. As best shown in FIGS. 8 and 9, the upper yoke 250 is generally similar in construction to the main wedge yoke 214, having a plurality of axially tapered fins 252 extending intermediate the tether fins 216. Wedges 254 are positioned intermediate the tether fins 216 and upper yoke fins 252 to prevent downward movement of the tether 212 relative to the upper yoke 250. Load from the upper yoke 250 is transmitted through an upper yoke ring beam 256 which is supported on a jacking bridge 258, which in turn is supported on the upper ring beam 244.

A plurality of hydraulic cylinders 260 are situated intermediate the upper yoke 250 and the upper ring beam 256. The hydraulic cylinders 260 provide the tether coupling 210 with jacking capability. By extending the hydraulic cylinders 260, the upper yoke 250 is forced upward relative to the mooring flat 240. Because the upper yoke wedges 254 lock the tether 212 against downward movement relative to the upper yoke 250, the action of the hydraulic cylinders 260 on the upper yoke 250 draws the tether 212 upward through the mooring flat 240 a distance equal to the stroke of the hydraulic cylinders 260. This movement is unrestrained by the main yoke 214 because the wedge orientation in both yokes 214, 250 is such as to allow free movement of the tether 212 upward through the yokes 214,250. Once the hydraulic cylinders 260 have reached their maximum stroke, the cylinders 260 can be retracted, moving the upper yoke 250 downward along the tether to its unextended position. Downward movement of the tether 212 is prevented by the main wedge yoke 214. With the upper yoke 250 returned to its unextended position, the jacking process can be repeated through as many strokes of the cylinders 260 as are necessary to bring the tether 212 to the desired tension.

To lower the tether 212 relative to the mooring flat 240 it is necessary to unload the main yoke wedges 224 and upper yoke wedges 254. This may be achieved by raising the tether 212 upward with a hoist (not shown) situated above the tether couplings 260. Once the wedges 224,254 are unloaded, they are lifted upward from their operating position. The hoist then lowers the tether 212 to the desired position, the wedges 224,254 are lowered back into contact their corresponding yoke fins 220,252 and support from the hoist can be removed.

To facilitate operation of the tether couplings 210, means can be provided to selectively drive the wedges between a locked and an unlocked configuration. Preferably, the wedge driving means includes a series of hydraulic cylinders situated in flanges (not shown) immediately above and below each of the yokes 214,250. By driving the wedges 224,254 toward their corresponding tapered yoke fins 220,252, the tether coupling 110 is preloaded, fixedly locking the tether 212 to the main wedge yoke 214 even in the absence of any loading on the tether 212. This hydraulic wedge driving means functions in a manner analogous to the mechanical wedge driving means 27 of FIG. 4. A wedge unloading means would force the wedges 224,254 away from the corresponding tapered yoke fins 220,252 to facilitate free upward and downward movement of the tether 212 once the tether load supported by the tether coupling 210 had been removed.

Figure 12:
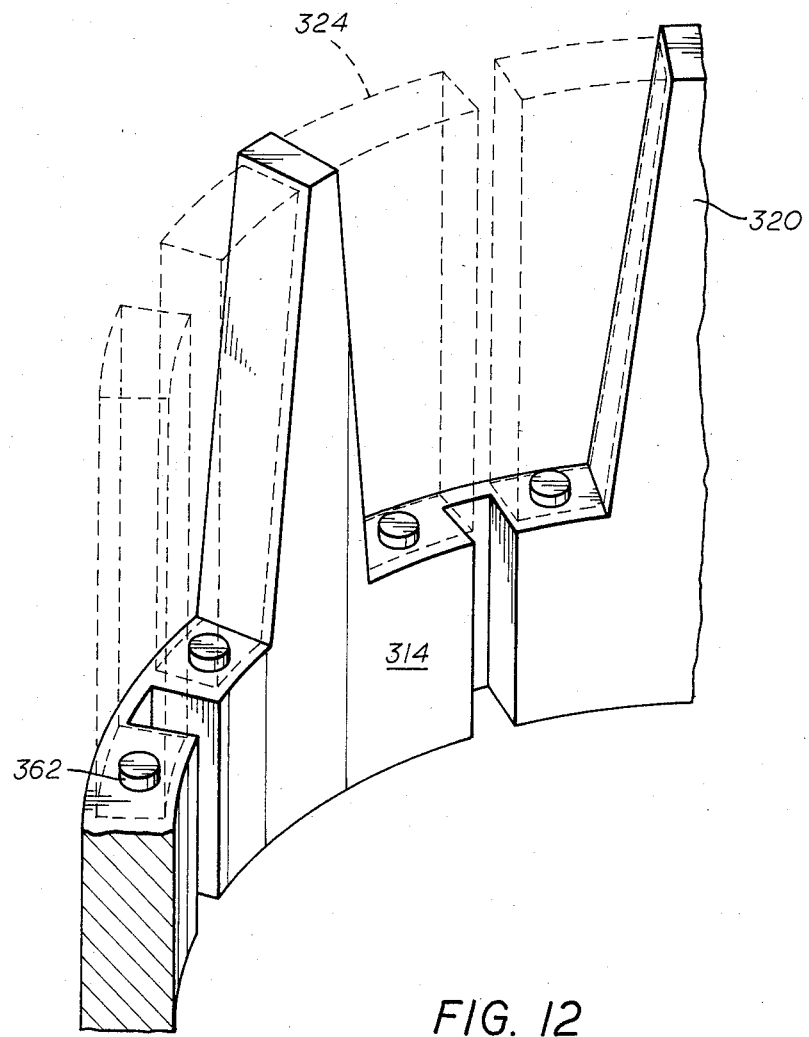
FIG. 12 shows a detail of an alternate embodiment of the present invention in which hydraulic rams are employed for selectively disengaging the wedges.
Figure 13:
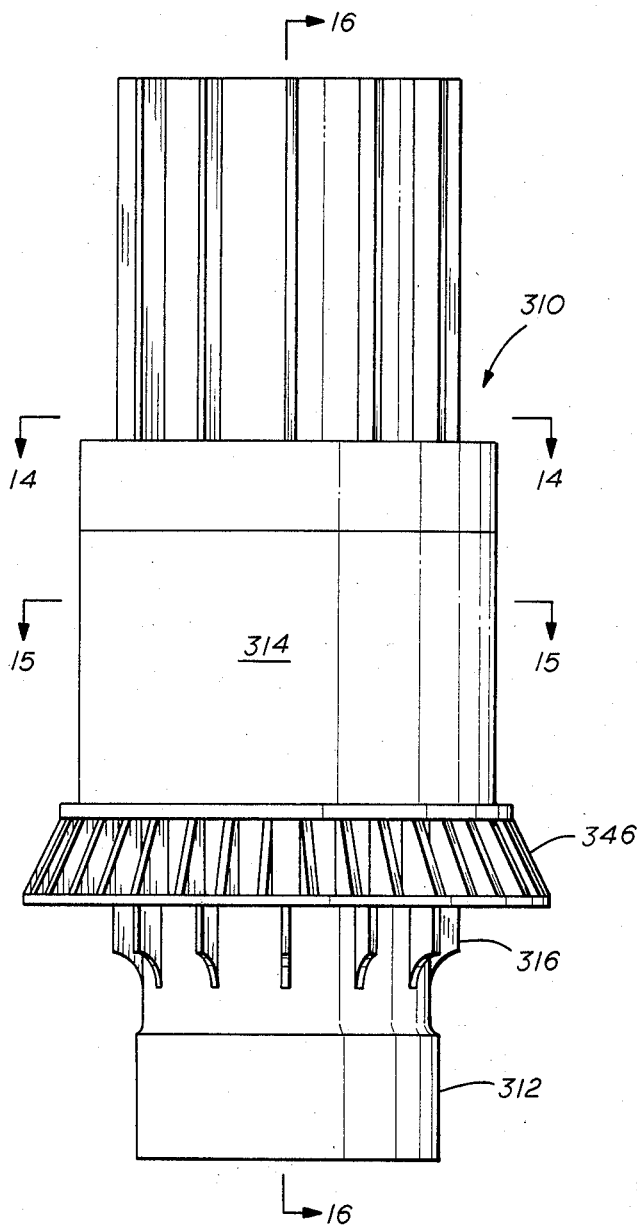
FIG. 13 is an elevational view of an alternate embodiment of a tether tensioning coupling suited for use in the tension leg platform of FIG. 7.

Shown in FIG. 12 is an illustrative embodiment of an alternate main wedge yoke 314 incorporating hydraulic release cylinders 362 for unloading the wedges 324. The embodiment of FIG. 12 also differs from previously described embodiment in that the main wedge yoke 314 defines an annularly arranged set of load support elements 320 which serve the function of the fins of the previously described embodiments. The load support elements 320 are separated by gaps into which the tether fins project. The lateral sides of the load support elements 320 define the surfaces along which the wedges 324 are supported on the load support elements 320.

Shown in FIGS. 13 through 19 are various views of an additional embodiment of the present invention. This embodiment utilizes a different type of wedge unit 324 than the previous embodiments. Use of this wedge unit 324 eliminates the need for providing the yoke 314 with fins. This simplifies and decreases the expense of the tether tension coupling 310.

As in the previous embodiment, each tether 312 is provided with a plurality of external, radial fins 316. The finned portion of the tether 312 extends through a yoke or other support member 314 having a substantially cylindrical inner surface. Unlike the previous embodiment, the yoke 314 is not provided with fins. As best shown in FIG. 16, the lower portion of the yoke 314 is provided with an annular support flange 315 extending radially inward. This flange 315 defines a wedge unit support surface 317. The flange 315 is provided with slots to permit passage of the fins 316. The yoke 314 is supported on the platform mooring flat 340 by a ring beam 346.

Figure 14:
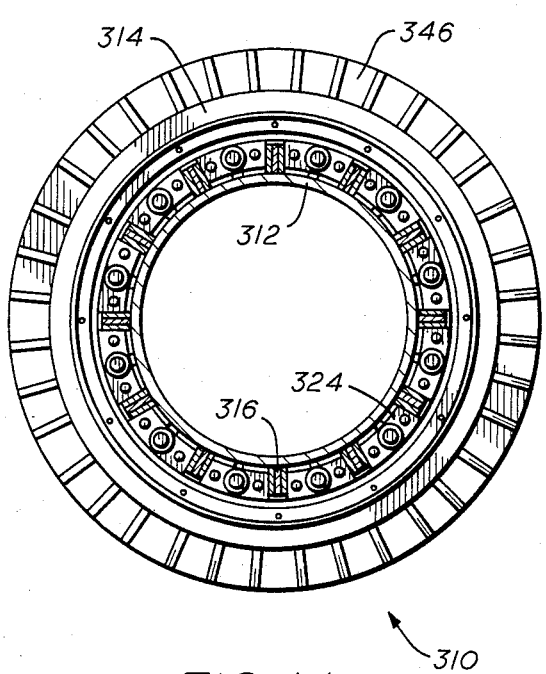
FIG. 14 is a cross sectional view taken along section line 14—14 of FIG. 13.
Figure 15:
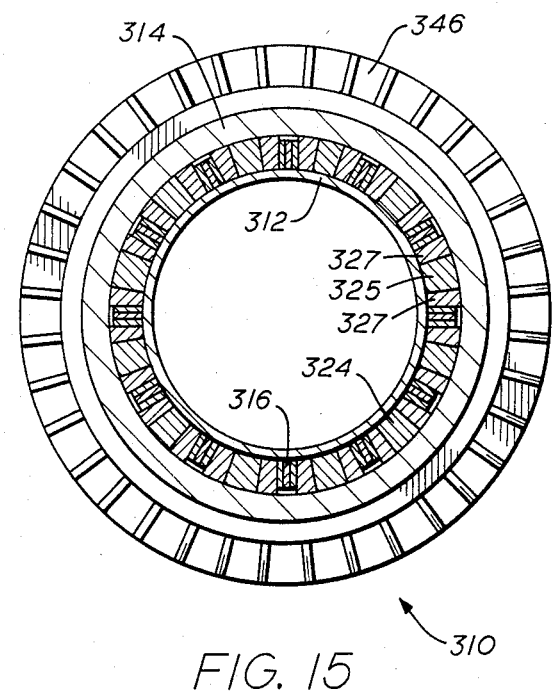
FIG. 15 is a cross sectional view taken along section line 15—15 of FIG. 13.

A wedge unit 324, best shown in FIG. 17, is situated in each of the spaces separating the tether fins 316. The lower portion of the wedge unit 324 seats against the support flange 315. The radially inner and outer faces of the wedge units 324 are curved to match the shape of the space into which they are positioned. Each wedge unit 324 includes a central wedge element 325 and a pair of outer wedge element 327. The interface between the central wedge element 325 and each of the outer wedge elements 327 is lined with a thin sheet of elastomeric material 333. The central wedge element 325 is tapered both radially and axially as best shown in FIGS. 17 and 19. As best shown by comparing FIGS. 17 and 19, the outer wedge elements are tapered only in the axial direction. Referring to FIGS. 14 and 15, as each wedge unit 324 is loaded, the outer wedge elements 327 are forced outward against the corresponding fins 316, causing the wedge unit 324 to be placed in compression in the direction extending between the fins 316. As a result of the radial taper of the central wedge element 325, this compressive loading forces the central wedge element 325 outward against the inner wall of the yoke 314. Thus, the loaded wedge unit 324 establishes wedging action acting between the facing surfaces of adjacent fins 316 and the inner surface of the yoke 314.

Means 329 are provided for driving the wedge elements 325, 327 together to establish the initial load on the wedge unit 324. Preferably, the wedge driving means 329 includes a hydraulic tensioner 331 anchored to the upper portion of the outer wedge elements 327. The wedge driving means 329 is controllable to move the central wedge element 325 upward relative to the outer wedge elements 327, thereby forcing the outer wedge elements 327 circumferentially outward against the corresponding fins 316 and forcing the central wedge element 325 radially outward against the inner wall of the yoke 314, thereby loading the wedge unit 324. The tensile loading on the tether 312 biases the outer wedge elements 327 downward, thus maintaining the wedge unit 324 under load. In this manner the tether 312 remains locked to the yoke 314 even in the event of failure of the wedge driving means 329.

In an alternate form (not shown) of the tether tensioning coupling, the yoke is provided with internal fins and the tether does not have fins. The tapers on the elements of each wedge unit are reversed relative to the wedge unit shown in FIGS. 17-19 so that as the central wedge element is forced downward relative to the outer wedge elements, the outer wedge elements are forced away from one another and the central wedge element is forced radially inward against the outer wall of the tether 312. Thus, a wedging action is obtained between the fins of the yoke and the outer surface of the tether locking the tether against downward motion relative to the yoke. In this embodiment the annular support flange is secured to the outer surface of the tether. The upper end of each of the wedge units seats against the support flange.

The present invention and the preferred modes of practicing it have been described. It is to be understood that the foregoing descriptions are illustrative only and that other means and techniques can be employed without departing from the full scope of the invention as described in the following claims.

What is claimed is:

1. An apparatus adjustably securing an elongate member to the main body of an offshore structure, said elongate member extending between said main body and the ocean bottom, comprising:
   a support member connected to said main body, said support member defining an axial recess adapted to receive said elongate member;
   a plurality of radial fins extending inwardly into said axial recess from said support member, said radial fins defining an annularly arranged series of axially extending channels;
   a plurality of radial fins extending outwardly from said elongate member, said elongate member and said support member being so sized and their respective fins so arranged that said elongate member can be positioned within said support member with the fins of said elongate member each extending into the channel between two adjacent fins of said support member to define a series of axially extending recesses laterally bounded on one side by an elongate member fin and on the other side by a support member fin; and
   at least one wedge positioned in each of said axially extending recesses.

2. The apparatus as set forth in claim 1, wherein there are a pair of opposed wedges positioned in each of said axially extending recesses, one of said wedges seated against an elongate member fin and the other of said wedges seated against a support member fin.

3. The apparatus as set forth in claim 1, wherein the thickness of said support member fins tapers in the axial direction.

4. A system adjustably securing the main body portion of a tension leg platform to a tether extending upward to said main body portion from a foundation on the seafloor, said system comprising:
   a support member connected to said main body portion, said support member defining an axial recess adapted to receive a corresponding tether;
   a plurality of radial fins extending inwardly into said axial recess from said support member, said radial fins defining an annularly arranged series of axially extending channels;
   a plurality of radial fins extending outwardly from said tether, said tether and said support member being so sized and their respective fins so arranged that said tether can be positioned within said support member with the fins of the tether each extending into the channel between two adjacent fins of said support member to define a series of axially extending recesses laterally bounded on one side by a tether fin and on the other side by a support member fin; and
   at least one wedge positioned in each of said axially extending recesses.

5. The apparatus as set forth in claim 4, wherein there are a pair of opposed wedges positioned in each of said axially extending recesses, one of said wedges seated against an elongate member fin and the other of said wedges seated against a support member fin.

6. The apparatus as set forth in claim 4, wherein the thickness of said support member fins tapers in the axial direction.

7. The system as set forth in claim 4, wherein each support member is a wedge yoke seated on a mooring flat, said mooring flat being an integral part of said main body portion.

8. Apparatus for adjustably securing the main body of a tension leg platform to a plurality of tethers extending upward to the main body portion from a foundation on the seafloor, said system comprising:
   a plurality of support members connected to said main body portion, each of said support members corresponding to one of said tethers and defining an axial recess having a substantially cylindrical inner surface, each of said tethers having an upper end extending into the axial recess of the corresponding one of said support members;
   a plurality of radial fins extending outwardly from the upper end of each tether toward the inner surface of the corresponding support member to define a series of axially extending recesses;
   a plurality of wedge units, each being situated in a corresponding one of said axially extending recesses of each support member-tether pair, said wedge units each including a pair of outer wedge elements, each outer wedge element being seated against a corresponding one of the two fins bounding said recess, and a central wedge element intermediate said outer wedge units, said outer and central wedge elements being tapered to cause said outer wedge elements to be biased away from one another and said central wedge element to be biased radially outward to seat against said support member inner surface in response to applying a downward loading on said tether, whereby said wedge unit locks said tether against downward movement relative to said support member.

9. The apparatus as set forth in claim 8 wherein each wedge unit includes means for biasing said central wedge element upward relative to said outer wedge elements.

10. A coupling for securing two elements together, comprising:
   a first member having a main body portion with a plurality of fins extending radially outward therefrom, said fins being arranged in an annular array, each of said fins defining two opposed load support surfaces;
   a second member having a substantially continuous load support surface defining a recess adapted to receive the finned portion of said first member, said second member being free from fins, said first and second members together defining an annularly arranged set of spaces each being bounded by the first member main body, the second member load support surface and the facing load support surfaces of an adjacent pair of said fins; and
   a plurality of wedge units, each being positioned in a corresponding one of said spaces, said wedge units each comprising at least two outer wedge elements and a central wedge element intermediate said outer wedge elements, said outer wedge elements each being seated against one of said fins and said central wedge element being seated against said second member load support surface, said wedge elements being tapered so that in response to biasing said central wedge element in a preselected direction relative to said outer wedge elements, said wedge unit establishes a wedging action action between the fins facing said wedge unit and that portion of the second member support surface adjacent said wedge unit, whereby said first and second members are locked together.

11. The coupling as set forth in claim 10 wherein said second member load support surface is cylindrical.

12. The coupling as set forth in claim 10 wherein said wedge units each include means for biasing said central wedge element in a preselected direction relative to said outer wedge elements.

* * * * *